Patented Jan. 31, 1939

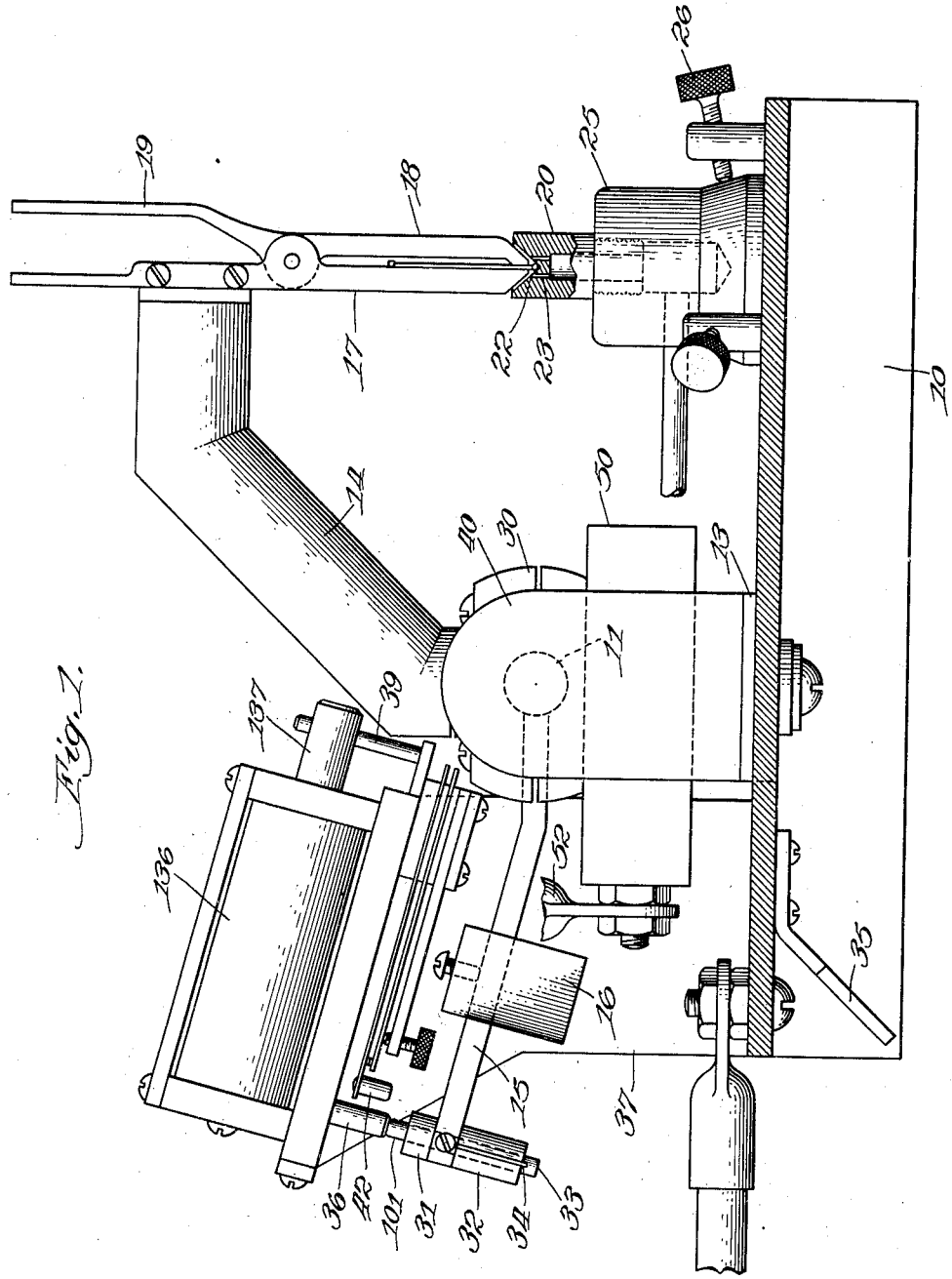

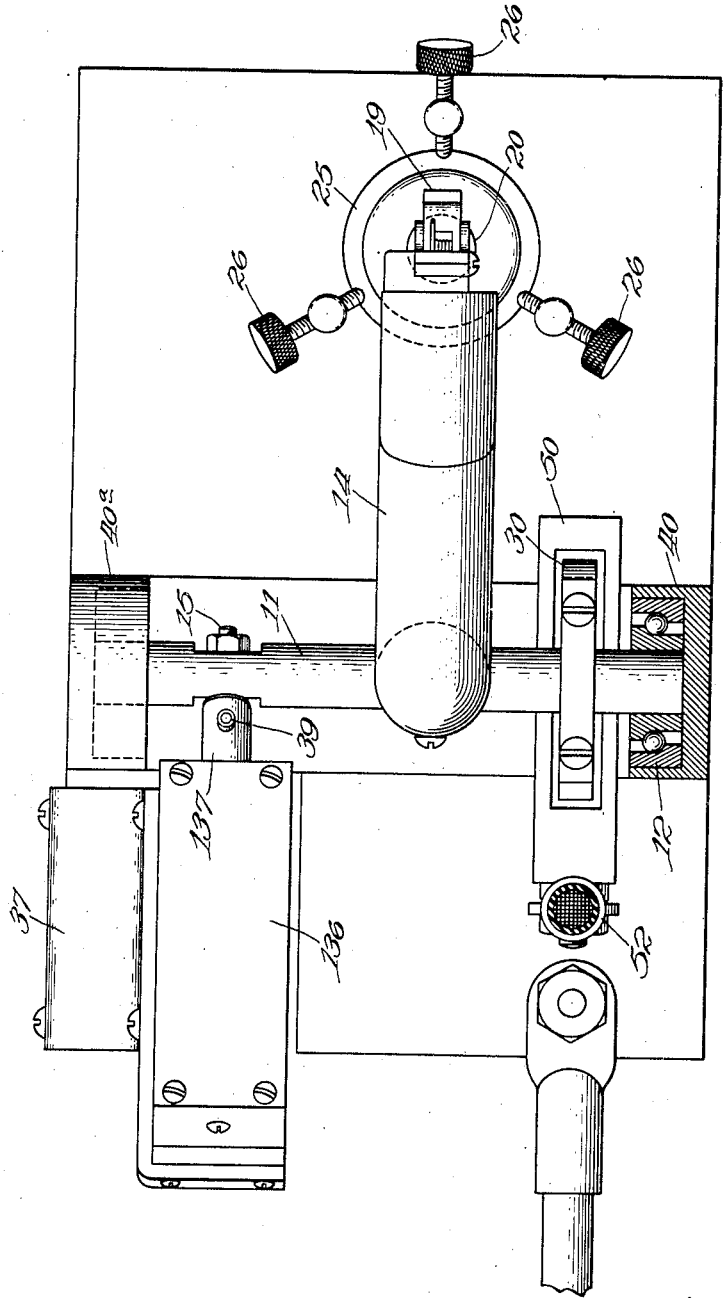

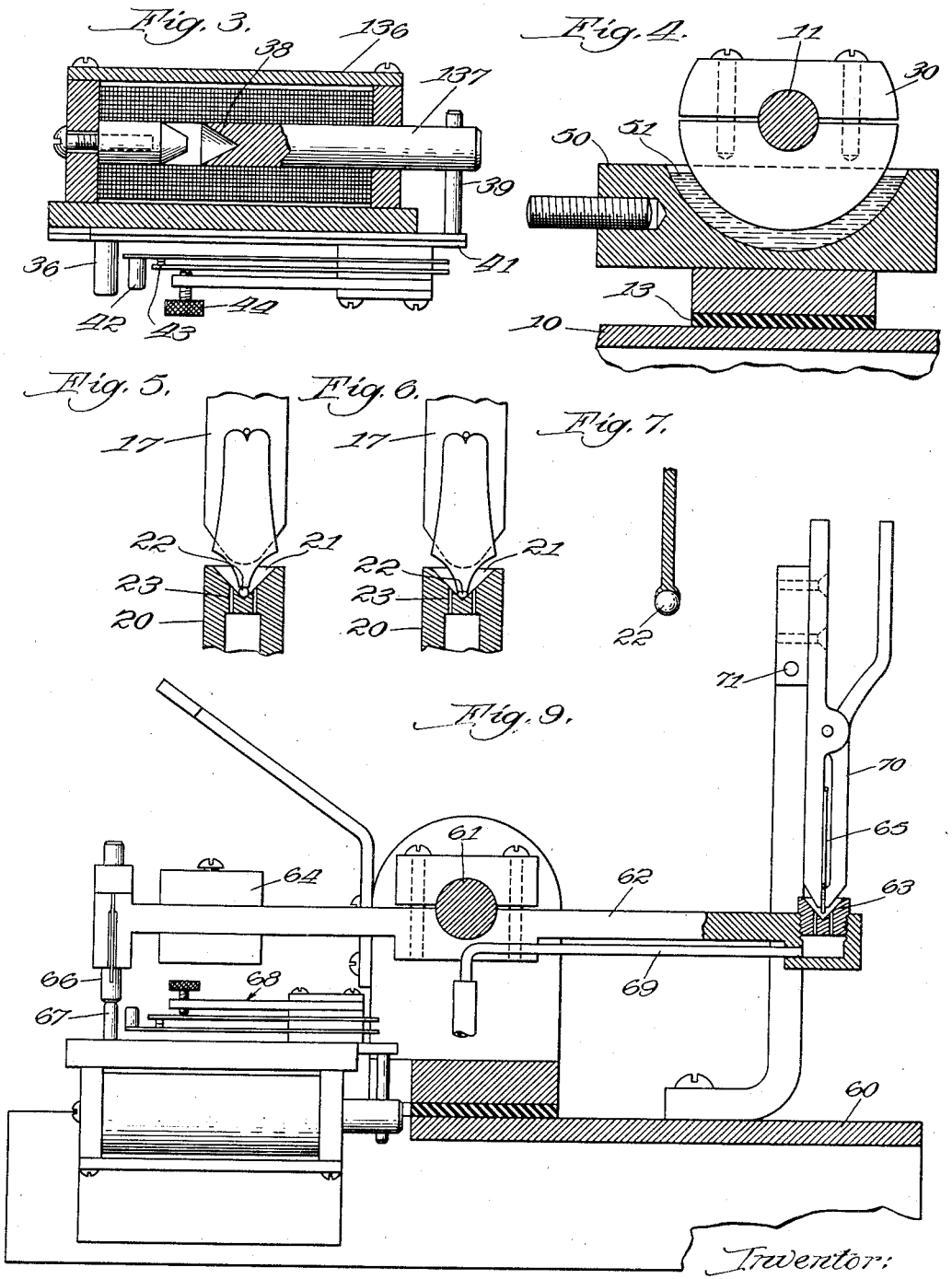

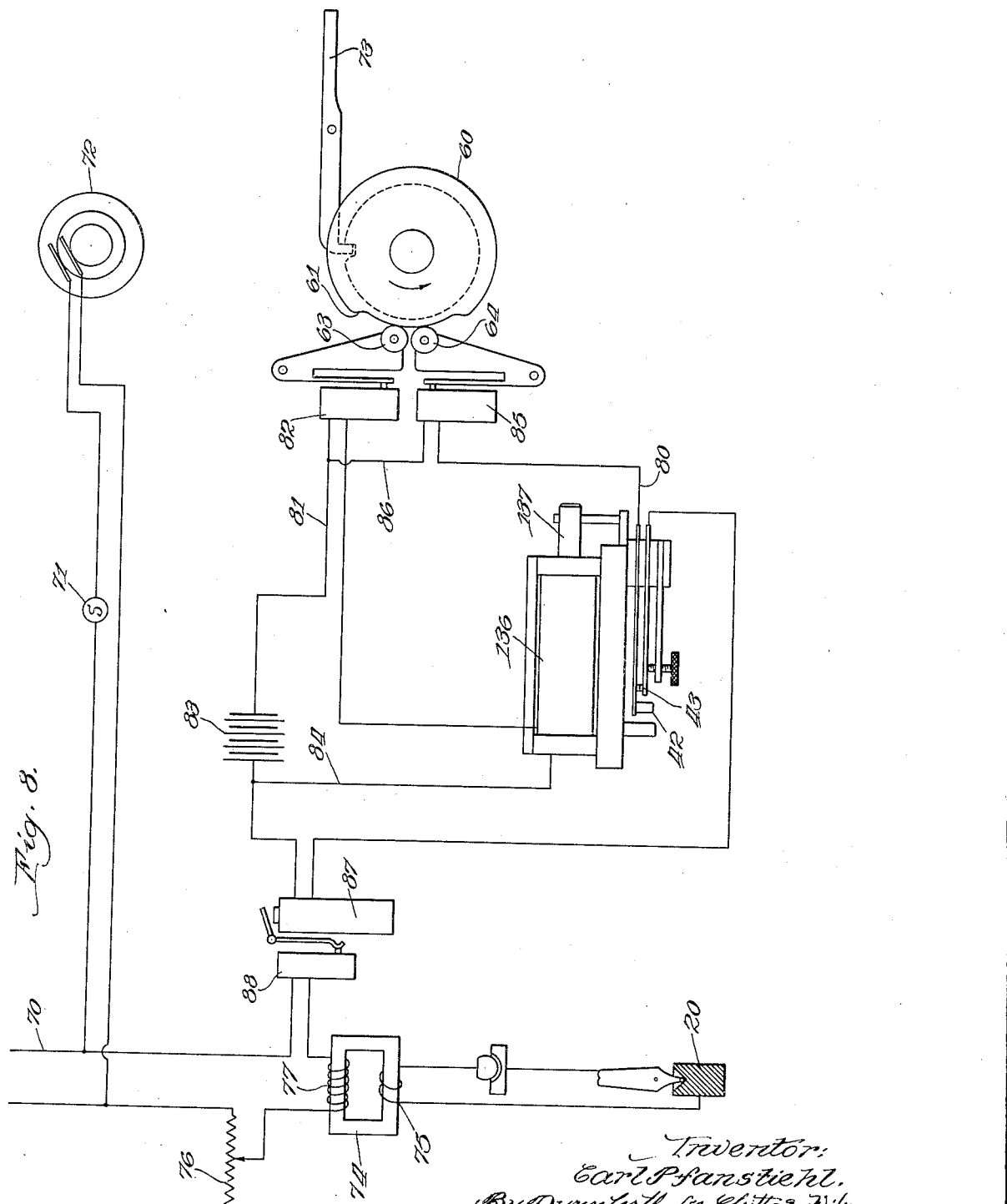

2,145,274

UNITED STATES PATENT OFFICE 2,145,274

TIPPING APPARATUS

Carl Pfanstiehl, Highland Park, Ill., assignor to Pfanstiehl Chemical Company, a corporation of Illinois Application February 19, 1937, Serial No. 126,712

11 Claims. (Cl. 219—4)

This invention relates to a tip-welding apparatus and method, and more particularly to such an apparatus and method for welding small tips on bases, such as pen nibs, meter pivots, phonograph needle shafts and the like.

The invention is illustrated in the drawings, in which—

Figure 1 is a side elevation, partly in section, of one form of the apparatus; Fig. 2 is a plan view thereof; Fig. 3 is a detailed view of the cut-off magnet; Fig. 4 is a fragmentary vertical section taken through the shaft of Fig. 2; Fig. 5 is an enlarged detail of a pen nib in relation to a tip pellet before welding; Fig. 6 is a similar view after welding; Fig. 7 is a fragmentary transverse view of pen nib and tip pellet after welding; Fig. 8 is a circuit diagram; and Fig. 9 is a side elevation, partly in section, of another form of this device.

Ordinary butt welding operations are entirely unsuitable for welding minute tips to bases. Butt welding normally forces the two parts together and causes a deformation of the hot metal, which on such minute parts causes splashes or bulges at undesired places. Moreover, these minute tips are not absolutely uniform in size or shape, and variations therein cause variations both in the contact resistance of the system and in the amount of heat energy necessary to heat the elements to fusion. These two variables cause considerable differences in the time of welding current flow, and therefore the usual time operated relay has been found to be unsuitable in such a welding operation. Even cut-off means operating as a result of the total power input are defective since variations in the size of the particles result in a higher or lower temperature than desired with the same electric power input.

The present apparatus disclosed herewith obviates these and other difficulties found in the art. The current cut-off means operates as a result of movement of either the tip or base toward the other a predetermined distance, and thus is a function of the amount of metal fused or melted. Thus the metal of the base, for example, can be heated until it flows over a desired proportion of the tip, generally about a third thereof and then the current is instantly cut off so that the base metal freezes substantially instantaneously on the tip and welds the base thereto. Since the base elements move together a distance which is directly proportional to the amount of metal melted away from them at the point of contact, variations in contact resistance, tip size or the like are ineffective to cause variations in the resultant weld.

The apparatus shown in Figs. 1-8 consists of a base 10, upon which is mounted the posts 40 and 40ª, which, in turn, carry the shaft 11, which is journalled in ball bearing 12. The post 40 is insulated from the base 10 by the insulation 13.

Pivotally mounted on the shaft 11 is the holder support 14 and the counter arm 15 carrying a counter weight 16. Positioned upon the holder support 14 in such manner as to be vertical when operatively employed, is the holder 17, provided with spring jaws 18 and handle 19. The entire holder is preferably of copper, as is likewise the holder support.

Positioned immediately below the holder is the tip receiver 20, which for low melting point tips is preferably of copper, but for higher melting point tips may preferably be made of a metal having more resistance, for example, tungsten. The top of the receiver is recessed, as shown at 21, to provide centering means for a tip pellet 22. A plurality of small holes 23 are provided around the tip and it is preferred to admit an inert gas such as hydrogen therethrough during the welding operation. Gas inlet 69 is shown, which may be attached to any source of gas.

The copper terminal is imbedded in a terminal support 25, which is adjustably held upon the base by the adjusting screws 26. Adjustment of the tip receiver is of great importance because the tips themselves, or the bases to which they are attached may be so formed or shaped that adjustment is required to secure exact centering.

Upon the counter arm 15 of the holder arm is a lost motion adjusting device 31, comprising a sleeve 32 within which is positioned a pin 33 frictionally held by friction spring 34. The pin 33 is forced into its uppermost position by impinging upon the stop 35 mounted on the base 10, when the holder is raised to remove a tipped base. Then when a new base is placed in the holder and the holder allowed to drop on a tip in the recess 21, the pin is brought against the lug 36 on the magnet mounting 37, and thus automatically adjusted to its proper position. The cut-off magnet 136 comprises a plunger 137 having a conical face 38 for the purpose of providing a long steady pull thereof. The plunger is rigidly connected through the arm 39 to the slide 41. Upon the slide is mounted the insulated spring switch 42 carrying the contact 43, the relation of which may be adjusted by the adjusting screw 44.

As shown in Figs. 4 and 5, the holder arm is energized through the mercury bath 51 contained in a recess in the copper block 50 with which terminal 52 is connected. The shaft 11 carries a copper disc 30 which dips into the mercury bath and maintains a connection at all times with the terminal, the shaft 11 likewise being of copper. This arrangement is preferred because it is inadvisable to carry the welding current through the ball bearings 12.

The wiring connections are shown diagrammatically in Fig. 8. The operation of the electric circuit is controlled by a cam 60 controlling switches 63 and 64. The arrangement of the cam is such that the cut-off magnet is first energized, followed immediately by the welding circuit.

The circuit comprises a 110-volt A. C. input 70 operating through a switch 71, with a motor 72, which frictionally drives the cams. A hand release lever 73 is provided, so that the cams may be operated independently with a motor switch. The welding circuit is taken off the secondary 75 of the transformer 74, one connection being to the copper terminal 20, and the other connection, as already described, through the terminal 52 to the pen nib. A rheostat 76 is provided in circuit with the primary 77 of the transformer.

The switch 42 carried by the cut-off magnet is connected through the line 80 to the relay switch 85 and the line 86 to the line 81, which leads to the cut-off magnet switch 82 and is also connected with the 6-volt battery 83, which likewise energizes the magnet through the line 84.

The cut-off contact 43 is connected to relay coil 87, which is adapted to energize the welding switch 88 and thus break the welding circuit.

In operation of the device, a base such as a pen nib is inserted in the holder 17 by lifting the holder support 14. This operation brings the pin 33 against the shoulder 35 and follows it into its raised position. A tip is then dropped in the recess 21 and the pen nib brought down in contact with it. This operation follows the upper end of the pin 33 into contact with the lug 36 and sets it as shown in Fig. 1. The operator may then press the hand release lever 73 upon which the cam 60 is driven and the shoulder 61 contacts successively the switches 63 and 64. On closing of the switch 63, the cut-off magnet 136 is energized and the plunger pulled in so that the switch 42 is pulled over the upper end 101 of the pin 33. The switch 42 is spaced the appropirate distance above the end of the lug 36 to provide precisely the proper drop for the holder 18. In normal operations, this drop will vary from .004 to .015 of an inch. The arrangement of the contact here shown is valuable in that it is near the end of the counter arm of the pivot and thus provides a greater range of movement and thus greater accuracy than if positioned closer to the point of pivoting.

Immediately thereafter the shoulder 61 contacts the switch 64 and energizes the welding circuit, which fuses the upper portion of the tip by the flow of current through it. The lower portion of the tip is not ordinarily fused by reason of the enormous metallic surface surrounding and in contact with it.

As soon as the upper part of the tip begins to melt, the holder 17 drops and raises the counter arm 15 and when enough of the tip is melted, the shoulder 101 of pin 33 strikes the switch 42 and breaks its contact with 43, thereby breaking the welding circuit through the relay coil 87.

The magnet circuit is broken upon rotation of the cam to its original position, permitting the switches 63 and 64 to regain their original positions.

The holder 17 should press very lightly upon the tip, owing to the small size of the latter, otherwise the tip will be deformed. It is therefore important that the counter arm and holder be carefully adjusted properly to limit this pressure.

The deep recess formed is provided to maintain an inert atmosphere about the tip.

Reference to Figs. 5, 6 and 7 shows the relationship of the pen to the pellet before and after welding. In Fig. 5 the pen is shown with its nib lightly contacting the pellet; Fig. 6 shows it after a portion of the pen nib has fused and flowed onto the pellet to form a wear joint which holds it thereto. Fig. 7 shows somewhat more clearly the fact that the tip of the base, here the nib of a pen, fuses and flows out over the upper surface of the pellet. Preferably the base metal should only cover about one-third of the surface of the pellet, since much less than that would not provide a good joint and a coverage of too much of the surface would require that the base metal be ground off in order that the writing surface would be on the tip metal rather than on the base metal. In the particular modification of this invention shown in Fig. 9 a base 60 supports on bearings a shaft 61 and transverse arm 62. The arrangement is similar to that described in connection with the preceding figures, and will not be repeated. It will be noted that in this form, however, the holder 63 for the pellet or tip is the element mounted on the movable arm 62, and thus it is the pellet which moves up under the urging of the counter weight 64 when part of the metal fuses and melts at the very tip of the base, here shown as a pen nib 65. With the exception of the fact that the pellet and holder are movable rather than the base holder, the construction of this modification is in general similar to that previously shown. The current cut-off means includes an actuating piece 66 cooperating with a stop 67 and a circuit breaking device 68 automatically pulled into operative relationship therewith before initiation of the welding current. Hydrogen is admitted through the tube 69 to the pellet holder.

The holder element 70 which grips the pen is here shown as mounted to enable rotation about the pivot 71, so that the holder may be swung up to cooperate with any desired automatic feed mechanism which may be used to place pens thereon.

It will be noted that the jaws of the holder 70 extend down very near the tip of the pen, leaving only a very small portion of the nib exposed. This is important, since it is desirable to prevent over heating of the pen nib except at the very point where it is desired to fuse the metal. Where pellets or tips are being welded to pens of austenitic steel, for example, overheating of the pen nib would cause it to lose its temper and bend back in an undesirable manner when it was later being used for writing. By having the heavy copper jaws of the holder grip the pen so that only $\frac{1}{32}$nd of an inch or thereabouts of its tip is exposed the heat is conducted away from that part of the pen gripped between the holder jaws and this trouble is obviated.

The foregoing detailed description has been given for clearness of understanding only, and no unnecessary limitations should be understood therefrom, but the appended claims should be construed as broadly as permissible, in view of the prior art.

I claim:

1. A welding apparatus for welding small tips to bases, comprising: a cupped member for loosely holding said tip by gravity only; a second member for holding said base, at least one of said members being movable and urged toward the other to hold said tip in lightly pressed contact with said base; means for fusing a portion of at least one of said elements in contact with each other, said means comprising an electric current; a current stopping means having a portion thereof contacting a stop whereby it is set to correspond to the contact position of said movable member; and magnetic means for automatically rendering said last-mentioned means effective to operate a circuit breaking means, whereby said current is automatically stopped upon movement of said movable holder toward the other a predetermined distance.

2. A welding apparatus for welding small tip elements to base elements, comprising: means for holding said elements and urging them together in lightly pressed contact; means for initiating an electric current to fuse a portion of at least one of said elements, said means including a circuit; electrically operated means in series with said circuit for automatically opening said circuit to stop the current upon movement of one of said elements a predetermined distance toward the other; and a second means for automatically opening said electrically operated circuit after a predetermined interval of time after the initiation of the welding current.

3. A welding apparatus for welding small tip elements to base elements, comprising: means for urging said elements together in lightly pressed contact; a circuit adapted to have a current flow therein for fusing a portion of at least one of said elements; a circuit breaker for opening said circuit upon movement of one of said elements a predetermined distance toward the other; electrically operated automatic means for setting the initial position of said circuit breaker to correspond to the initial contact position of the movable element; means for initiating current flow in said circuit after said setting; and a second circuit breaker for opening the circuit for said electrically operated automatic means a predetermined time interval after initiation of said current flow.

4. In a welding apparatus for welding small tips to bases comprising members for holding said elements, at least one of the members being movable and urged toward the other to hold the tip in lightly pressed contact with the base, means for fusing a portion of at least one of said elements in contact with the other, said means comprising an electric circuit, a current stopping means having a portion thereof contacting a stop whereby it is set to correspond to the contact position of said movable member, electro-magnetic means for automatically rendering said last mentioned means effective to operate a circuit breaking means, whereby said current is automatically stopped upon movement of said movable holder toward the other a predetermined distance, and a second means for automatically opening the electro-magnetic circuit after a predetermined interval of time after the initiation of the welding current.

5. A welding apparatus for welding small tips to bases comprising a cupped member shaped and positioned loosely to receive and position said tip and retain it solely by gravity; a second member for holding said base, said tip-receiving member being fixed and said base-holding member being positioned above the tip-receiving member and swingably mounted to be movable relative thereto in one plane only to hold said tip in lightly pressed contact with said base, means for passing an electric current through the tip and base to fuse a portion of at least one of them, and means for automatically stopping the current upon movement of said base-holders toward the tip-holder a predeteremined distance.

6. Apparatus of the character set forth in claim 5 in which the current-stopping means is movable with the base-holding member and is located at a substantial distance from the axis of said swingable movement.

7. Apparatus as set forth in claim 5 in which a counterbalance is provided for the base-holder and means are located at a substantial distance from the swingable mounting of the base-holders for breaking the welding circuit upon drop of the holder a predetermined distance.

8. Apparatus as set forth in claim 5 in which the base-holder is swingably mounted on a ball bearing support and is provided with an electrical circuit through the support, including a fluid conductor by-passing the ball bearing.

9. In a welding apparatus for welding minute tips to bases, a support, a deeply cupped tip holder upon the support and adapted to hold a tip therein solely by gravity, and a base-holder pivotally mounted upon the support to move in one plane only, the base-holder being positioned to rest a base directly upon a tip in the cupped tip holder.

10. A welding apparatus for welding small tips to bases comprising a cupped member shaped and positioned loosely to receive and automatically position said tip and retain it solely by gravity, a second member for holding the base, at least one of said members being movable and urged toward the other to hold the tip in lightly pressed contact with the other, means for passing an electric current through the tip and base to fuse a portion of at least one of them, and means for automatically stopping the current upon movement of one of said holders toward the other a predetermined distance.

11. The method of welding small tip elements to much larger base elements which comprises loosely confining the tip element, urging said elements together in lightly pressed contact, passing an electric current therethrough to fuse a portion of at least one of said elements, and automatically stopping the current upon movement of one of said elements a predetermined distance toward the other.

CARL PFANSTIEHL.